US010790646B1

(12) United States Patent
Flojo et al.

(10) Patent No.: US 10,790,646 B1
(45) Date of Patent: Sep. 29, 2020

(54) GROUNDING DEVICES (71) Applicant: HONEYWELL INTERNATIONAL INC., Morris Plains, NJ (US)

(72) Inventors: Alfred R. Flojo, Chicago, IL (US); Leszek Lazarz, Norridge, IL (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 30 days.

(21) Appl. No.: 16/366,031

(22) Filed: Mar. 27, 2019

(51) Int. Cl.
*B25B 28/00* (2006.01)
*H02G 1/02* (2006.01)
*H02G 7/05* (2006.01)
*H01R 4/52* (2006.01)
*H01R 4/66* (2006.01)
*H01R 11/14* (2006.01)
*H01R 4/38* (2006.01)

(52) U.S. Cl.
CPC ............... *H02G 1/02* (2013.01); *B25B 28/00* (2013.01); *H01R 4/38* (2013.01); *H01R 4/52* (2013.01); *H01R 4/66* (2013.01); *H01R 11/14* (2013.01); *H02G 7/053* (2013.01)

(58) Field of Classification Search
CPC . H02G 1/02; H02G 7/053; H01R 4/38; H01R 4/52; H01R 4/66; H01R 11/14; B25B 28/00
USPC ............... 294/174; 81/53.1; 29/750
See application file for complete search history.

(56) References Cited

U.S. PATENT DOCUMENTS

| | | | | |
|---|---|---|---|---|
| 2,288,776 A | * | 7/1942 | Bodendieck | H01R 11/15 81/112 |
| 2,352,686 A | * | 7/1944 | Broadbooks | H01R 11/14 81/53.1 |
| 3,017,905 A | * | 1/1962 | Klein | H01R 43/0427 140/113 |
| 3,666,311 A | * | 5/1972 | McMullin | B25J 1/04 29/750 |
| 3,788,691 A | * | 1/1974 | McMullin | B25J 1/04 29/750 |
| 3,866,136 A | * | 2/1975 | Augustin | H03F 1/52 330/298 |
| 4,242,930 A | * | 1/1981 | Myers | B25B 23/142 294/174 |

(Continued)

FOREIGN PATENT DOCUMENTS

| | | |
|---|---|---|
| CN | 207200117 U | 4/2018 |
| CN | 207643029 U | 7/2018 |
| CN | 208438267 U | 1/2019 |

*Primary Examiner* — Paul T Chin
(74) *Attorney, Agent, or Firm* — Alston & Bird LLP (57) ABSTRACT

A shotgun stick for use with grounding devices is provided. An example shotgun stick includes a housing and a drive shaft supported within the housing. The shotgun stick further includes a clamp stick head attached to the housing at a first end and operably connected to a first end of the drive shaft such that rotation of the drive shaft actuates the clamp stick head. The shotgun stick also includes a ratchet locking module that selectively limits rotation of the drive shaft via engagement between a side pin and a ratchet gear of the ratchet locking module. The clamp stick head includes an exterior housing, a head sleeve that defines an opening configured to receive a tool attachment secured thereto, and a slotted inner sleeve positioned between the exterior housing and the head sleeve that prevents rotation of a tool attachment received by the head sleeve.

20 Claims, 10 Drawing Sheets

(56) References Cited

U.S. PATENT DOCUMENTS

| | | | |
|---|---|---|---|
| 5,096,438 A * | 3/1992 | Black | H01R 11/14 200/48 R |
| 9,768,576 B2 * | 9/2017 | Sook | H01R 43/26 |
| 2017/0317437 A1 * | 11/2017 | Quaedvlieg | H01R 43/22 |
| 2018/0107234 A1 * | 4/2018 | Nagaki | B25B 7/14 |
| 2018/0115090 A1 * | 4/2018 | Rahman | H01R 11/15 |
| 2019/0097100 A1 * | 3/2019 | Yoo | H01L 33/58 |
| 2019/0190171 A1 * | 6/2019 | Rahman | H01R 4/5008 |

* cited by examiner

GROUNDING DEVICES

TECHNOLOGICAL FIELD

Example embodiments of the present invention relate generally to electrical systems and, more particularly, to grounding and insulating devices.

BACKGROUND

Electrical linemen are often concerned with preventing electrical shocks, especially when working with high voltage/amperage applications. Linemen may use an elongate stick, pole, hot stick, or shotgun stick to grab an electrical conductor (e.g., an electric wire, post, or ball stud) and ground the electrical conductor. Applicant has identified a number of deficiencies and problems associated with conventional grounding devices. Through applied effort, ingenuity, and innovation, many of these identified problems have been solved by developing solutions that are included in embodiments of the present invention, many examples of which are described in detail herein.

BRIEF SUMMARY

Conventional grounding devices, hot sticks, shotgun sticks, and the like allow for electrical linemen to prevent electrical shocks by grounding an electrical connection. These conventional devices, however, are often bulky and difficult to use. For example, an electrical lineman may be required to extend a hot stick overhead to connect to an overhead power line. During extension, these traditional devices fail to prevent retraction of the hot stick and fail to allow the lineman to easily lock the hot stick at a desired position. Furthermore, the grounding end of these conventional hot sticks may be unintentionally switched between a locked position in which the grounding end is secured to the hot stick and an unlocked position in which the grounding end separates from the hot stick. In this way, conventional hot sticks fail to securely connect with grounding ends so as to prevent unintentional disengagement of the grounding end and associated potential danger to the lineman. Apparatuses, systems, and associated methods are described for use with grounding devices that address these deficiencies and others by utilizing a ratchet locking module configured to prevent retraction of the device and a slotted inner sleeve of a clamp stick head to prevent unintentional disengagement of the grounding end.

With reference to the claimed apparatus, a shotgun stick is provided that includes a housing that defines a first end and a second end opposite the first end. The shotgun stick may further include a drive shaft supported within the housing, and a clamp stick head attached to the housing at the first end. The clamp stick head may be operably connected to a first end of the drive shaft such that rotation of the drive shaft actuates the clamp stick head. The shotgun stick may further include a ratchet locking module that selectively limits rotation of the drive shaft via engagement between a side pin and a ratchet gear of the ratchet locking module.

In some embodiments, the shotgun stick may also include a motor assembly operably connected to a second end of the drive shaft. In such an embodiment, the motor assembly may be configured to drive the drive shaft so as to actuate the clamp stick head.

In some cases, the clamp stick head may include a grounding clamp assembly that receives an electrical conductor therein. In such an embodiment, the shotgun stick may also include a torque connector coupled with a first end of the drive shaft that operably connects the first end of the drive shaft to the clamp stick head.

In some embodiments, the ratchet locking module may also include a first ratchet gear affixed to the drive shaft and a first side pin. In such an embodiment, the first side pin may move between a first position in which the first side pin mates with the first ratchet gear and a second position in which the first side pin disengages the first ratchet gear. In an instance in which the first side pin is in the first position, the first side pin may prevent rotation of the first ratchet gear in a first direction.

In some further embodiments, the ratchet locking module may include a second ratchet gear affixed to the drive shaft and a second side pin. The second side pin may move between a first position in which the second side pin mates with the second ratchet gear and a second position in which the second side pin disengages the second ratchet gear. In an instance in which the second side pin is in the first position, the second side pin may prevent rotation of the second ratchet gear in a second direction.

In some alternative embodiments, the ratchet locking module includes a dual ratchet gear, a first side pin and a second side pin. The first side pin may move between a first position in which the first side pin mates with the dual ratchet gear and a second position in which the first side pin disengages the dual ratchet gear. The second side pin may move between a first position in which the second side pin mates with the dual ratchet gear and a second position in which the second side pin disengages the dual ratchet gear. In such an embodiment, the first side pin and the second side pin may be pivotally attached to the housing.

In some cases, a first spring may be connected between the housing and the first side pin so as to urge the first side pin to the first position. Similarly, a second spring may be connected between the housing and the second side pin so as to urge the second side pin to the first position.

In some further embodiments, the ratchet locking module may include a third spring connected between the first side pin and the second side pin. In an instance in which the first side pin is in the second position, the third spring may urge the second side pin to the first position, and, in an instance in which the second side pin is in the second position, the third spring may urge the first side pin to the first position.

In such an alternative embodiment, in an instance in which the first side pin and the second side pin are each in the first position, the first and the second side pins may prevent rotation of the dual ratchet gear. In an instance in which the first side pin is in the first position and the second side pin is in the second position, the first side pin may prevent rotation of the dual ratchet gear in a first direction. In an instance in which the second side pin is in the first position and the first side pin is in the second position, the second side pin may prevent rotation of the dual ratchet gear in a second direction.

In any embodiments, the clamp stick head may be detachable from the first end of the housing.

In some instances, the clamp stick head also includes an exterior housing, and a head sleeve within the exterior housing. The head sleeve may define an opening configured to receive a tool attachment secured thereto. The clamp stick head may also include an inner sleeve positioned between the exterior housing and the head sleeve. The inner sleeve may define a slotted portion that prevents rotation of the tool attachment in an instance in which the tool attachment is secured to the opening in the head sleeve.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
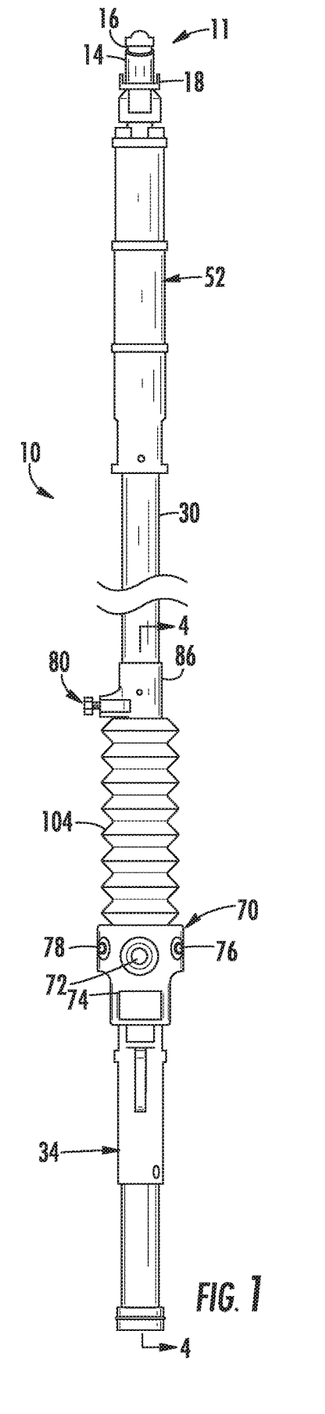
FIG. 1 is a front view of a shotgun stick in a loaded position according to an example embodiment.
Figure 2:
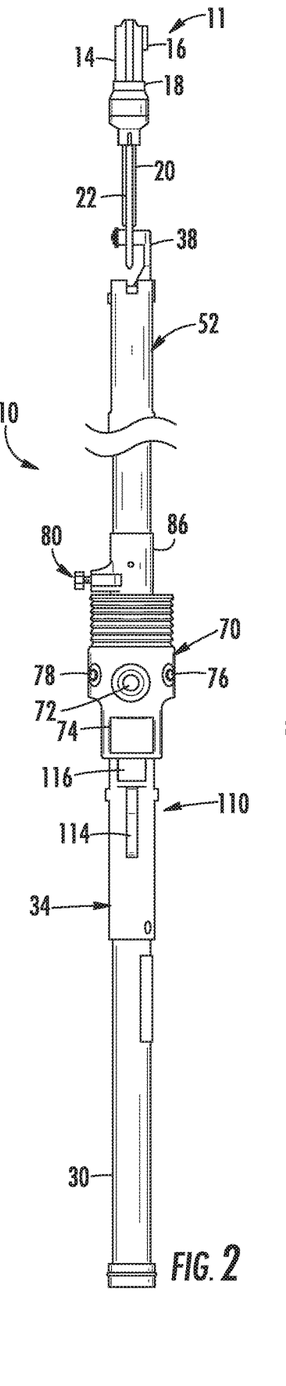
FIG. 2 shows the shotgun stick of FIG. 1 in a loading position according to an example embodiment.
Figure 3:
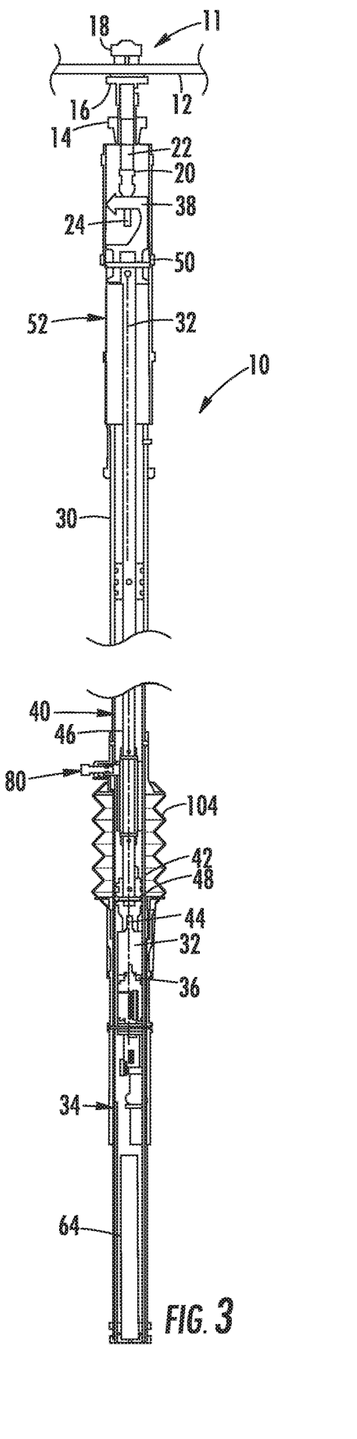
FIG. 3 is a sectional view of the shotgun stick of FIG. 1.

With reference to FIGS. 1-3, a shotgun stick 10 is illustrated with an example grounding clamp 11. As described hereafter, the grounding clamp 11 may be configured for use with an overhead electrical conductor 12 (e.g., as shown in FIG. 3). While described herein with reference to an example shotgun stick 10, the present disclosure contemplates that the embodiments described herein may be equally applicable to hot sticks, insulated devices, or other grounding devices. Said differently, the present disclosure appreciates that a shotgun stick (e.g., shotgun stick 10) may refer to a particular implementation of a grounding device in which a hot stick (e.g., elongate, insulated pole) is attached to a grounding clamp. For the sake of consistency of description, however, reference herein is made to a shotgun stick as the example grounding device. As described hereafter with reference to FIGS. 12-18, a clamp stick head (e.g., clamp stick head 101) may be attachable to a hot stick (e.g., an insulating rod) such that the combined clamp stick head and hot stick operate similar to a shotgun stick. While illustrated herein with a particular shape and configuration, the present disclosure contemplates that the shotgun stick and detachable clamp stick may be formed in various designs, form factors, housings, and the like based upon the intended application of the grounding device.

As shown, the grounding clamp 11 may include a body 14 that may be connectable to the electrical conductor 12 to provide an electrically conductive connection with the grounding clamp 11 in a clamped condition. The grounding clamp 11 may define first and second jaws 16 and 18 extending from the body that are movable relative to one another between an open position and a closed position. In the open position, the overhead electrical conductor 12 may be inserted into the grounding clamp 11, and in the closed position, the overhead electrical conductor 12 may be clamped between the jaws 16 and 18 to provide an electrically conductive connection between the grounding clamp 11 and the overhead electrical conductor 12. The clamp 11 may include a rotatable member 20 mounted for rotation about an axis 22. The rotatable member 20 may include a torque connector 24 illustrated in the form of a torque ring or eyelet 24 configured to transfer a rotational torque applied by the drive shaft 40 to the rotatable member 20 to thereby actuate the jaws 16 and 18 between the open and the closed positions. In this regard, the rotatable member 20 may define external screw threads that are engaged with mating internal screw threads in the body 14 such that the rotatable member 20 translates along the axis 22 in response to the engagement of the screw threads as the rotatable member 20 is rotated about the axis 22.

It should be understood that although the shotgun stick 10 is shown and described herein in connection with a grounding clamp 11 defining clamp jaws 16, 18, the disclosed shotgun stick 10 may be equally utilized with other types of grounding clamps (e.g., C-clamps, duck bill clamps, ball stud clamps) as well as grounding clamps having other types of rotatable members for actuating the grounding clamp between open and closed positions. Furthermore, in some embodiments (e.g., FIG. 12), the shotgun stick 10 may be configured to receive a clamp stick head that is detachable from the body of the shotgun stick. Said differently, the present disclosure contemplates modular components (e.g., clamp stick head 101) that may be removable from the shotgun stick 10 and/or may be adapted to receive a variety of devices attached thereto (e.g., clamping jaws, tools, etc.). Accordingly, the shotgun stick 10 described herein is not intended to be limited in any way to any particular type of grounding clamp.

The shotgun stick 10 may include an elongate electrically insulating tube 30 defining a longitudinal axis 32; a bottom housing 34 mounted on the tube 30 to translate relative to the tube 30 along the axis 32 between a loaded position shown in FIGS. 1 and 3 and a loading position shown in in FIG. 2; an electrical motor 36 mounted to the bottom housing 34 for translation therewith; a hook-shaped torque connector 38 configured to engage a torque connector of a grounding clamp, such as the torque connector 24 of the grounding clamp 11; and a drive shaft 40 operably connected to the motor 36 and the torque connector 38 to transfer torque from the motor 36 to the torque connector 38 and to translate relative to the tube along the axis 32 with the motor 36 and the bottom housing 34. While any suitable material can be utilized, in the illustrated embodiment the tube 30 and the drive shaft 40 are formed from fiber reinforced plastic (FRP).

With continued reference to FIGS. 1-3 and 7, the drive shaft 40 may include a torque connector 38 that connects the drive shaft 40 to a motor shaft 44 of the motor 36 such that the drive shaft 40 rotates with the motor shaft 44. The connector 38 may be fixed to a rod member 46 of the drive shaft 40 via a drive pin 48. It should be appreciated that while illustrated as a two piece construction, the present disclosure contemplates that any suitable torque connector 42 may be utilized and/or that the rod member 46 and connector 42 may be formed as an integral, one piece member. Similarly, the torque connector 38 may be joined to an upper end of the drive shaft 40 via a threaded fastener or drive pin 50, or may also be formed as a unitary member of the drive shaft 40. It should also be appreciated that while a particular form of the torque connector 38 is shown, any suitable form may be utilized with the shotgun stick 10 according to this disclosure.

The shotgun stick 10 may further include an upper housing 52 fixed to the tube 30 and sized such that the torque connector 38 and at least a lower portion of a grounding clamp, such as the grounding clamp 11, may be received and supported within the upper housing 52 with the shotgun stick 10 in a loaded position such as shown in FIGS. 1 and 3, and so that the torque connector 38 can be extended outside of the upper housing 52 for connection with a grounding clamp, such as the grounding clamp 11, with the shotgun stick 10 in a loading position such as shown in FIG. 2. It should be understood that the housing 52 may be dimensioned (e.g., sized and shaped) to accommodate any type of grounding clamp utilized with the shotgun stick 10. The shotgun stick 10 may further include a flexible bellows 104 that has an upper end engaged with the housing 86. The bellows 104 may operate to restrict or prevent the ingress of water, dust, and/or other environmental contaminants into the interior of the shotgun stick 10.

Figure 4:
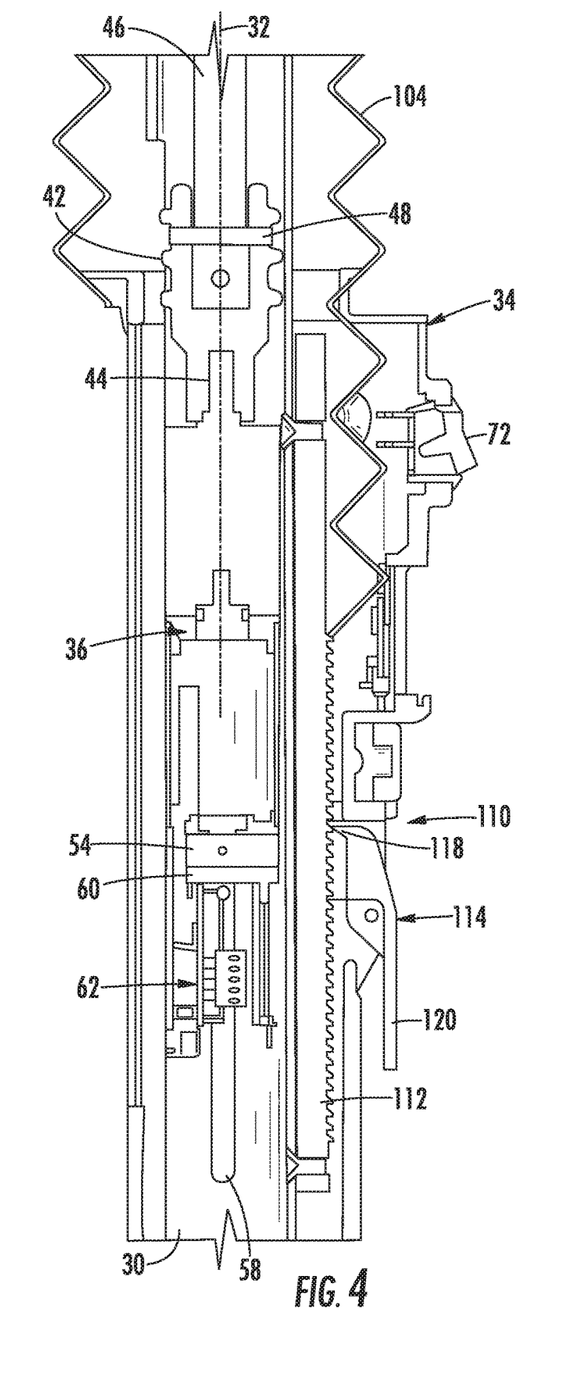
FIG. 4 is an enlarged view taken along line 4-4 in FIG. 1 showing a selected portion of the shotgun stick.
Figure 5:
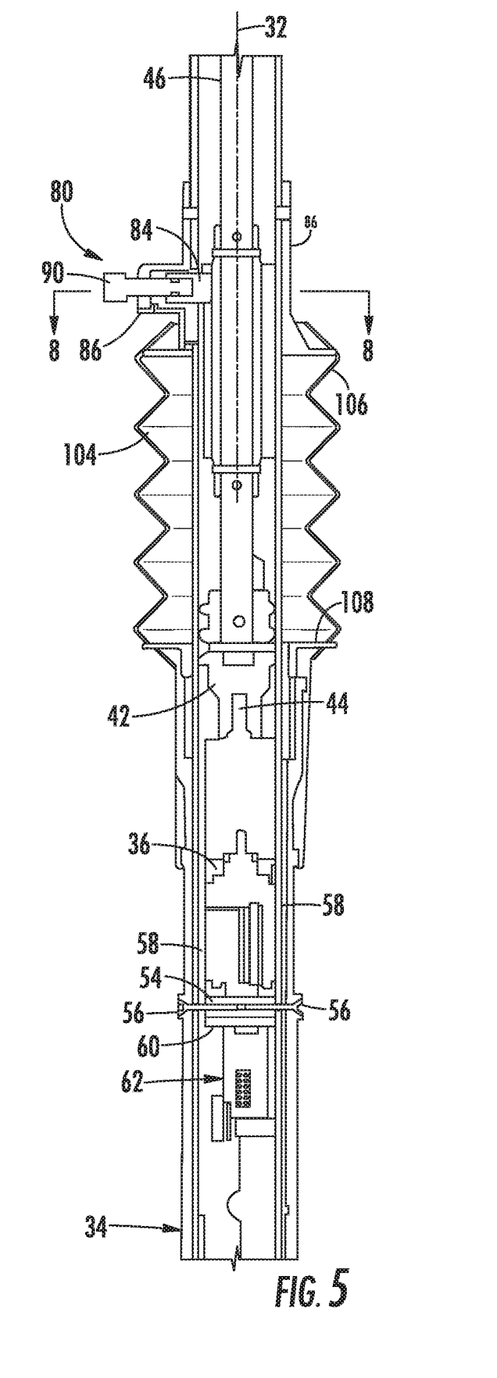
FIG. 5 is an enlarged view of a portion of FIG. 3.

With reference to FIGS. 4-5, the shotgun stick 10 may include a motor 36 that is a brushless DC motor (BLDC motor). The motor 36 may be carried on a motor mounting plate 54 that is fixed to the bottom housing 34 via fasteners 56 that extend from the bottom housing 34 to the mounting plate 54 through a pair of longitudinal slots 58 formed in the tube 30 extending parallel to the axis 32. The fasteners 56 are guided in the slots 48 for the translation of the bottom housing 34 relative to the tube 30 along the axis 32. A control circuit mounting plate 60 is fixed to the motor mounting plate 54 and carries the control circuitry 62 for the motor 36 and a user interface 70. A power supply in the form of a battery 64 is carried in a lower portion of the tube 30 to power the electrical component of shotgun stick 10.

As shown in FIG. 4, the shotgun stick 10 may also include a ratchet mechanism 110 that includes a toothed rack 112 fixed to the tube 30, a ratchet lever 114 pivotably mounted to the bottom housing 34, and a ratchet button 116 that allows the ratchet mechanism 110 to be placed in a locked condition. The ratchet button 116 may be movable by a user from a position in which it engages the rack 112 to prevent relative motion between the bottom housing 34 and the tube 30, and a free position in which the bottom housing 34 and the tube 30 may translate relative to one another. The ratchet lever 114 may include a tooth 118 that engages with the rack 112 to allow the bottom housing 34 and the tube 30 to be extended relative to each other while engaging the rack 112 to prevent the bottom housing 34 and the tube 30 from retracting relative to each other unless a lever portion 120 of the ratchet lever 114 is engaged by a user. It should be understood that while a particular ratchet mechanism is shown, any suitable ratchet mechanism may be utilized.

Figure 6:
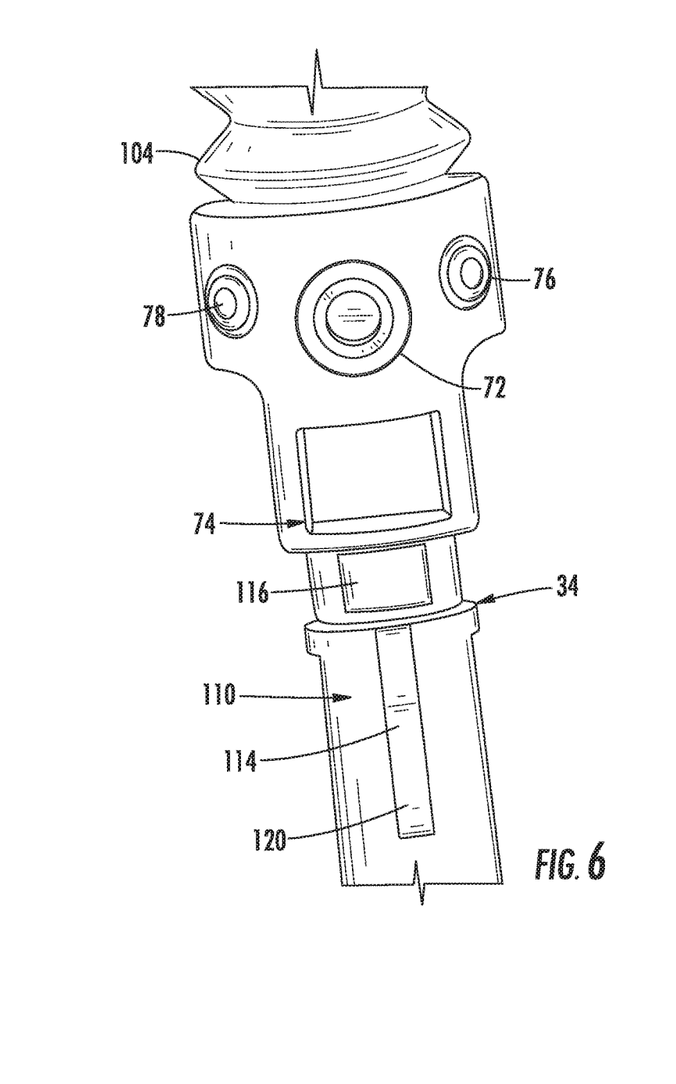
FIG. 6 is an enlarged view of another portion of the shotgun stick.
Figure 7:
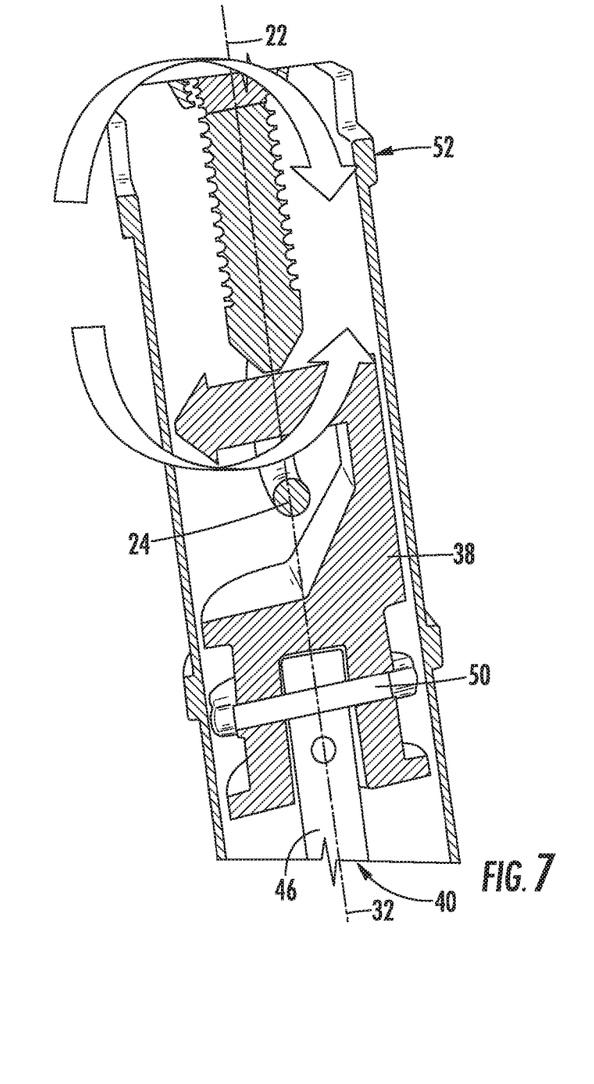
FIG. 7 is an enlarged perspective view of another portion of the shotgun stick.

With reference to FIG. 6, the shotgun stick 10 may, in some embodiments, define a user interface unit 70 that is formed as part of the bottom housing 34 and includes a power switch 72, a user display 74, and a pair of motor control switches 76 and 78. The user display 74 may be provided in the form of a suitable LCD display. The power switch 72 may connected to a battery 64 to control the power to and from the motor 36, the motor control circuitry 62, and the user interface 70. The switch 76 may operably connected to the motor control circuitry 62 so as to drive the motor 36 to rotate the shafts 40 and 44 so as to actuate a grounding clamp, such as a grounding clamp 11, to a clamped position wherein a conduit is clamped between the jaws of the clamp. The switch 78 may be operably connected to motor control circuitry so as to drive the motor 36 in an opposite direction to rotate the shafts 40 and 44 so as to actuate the jaws of a clamp, such as a clamp 11, to an open position.

Figure 8A:
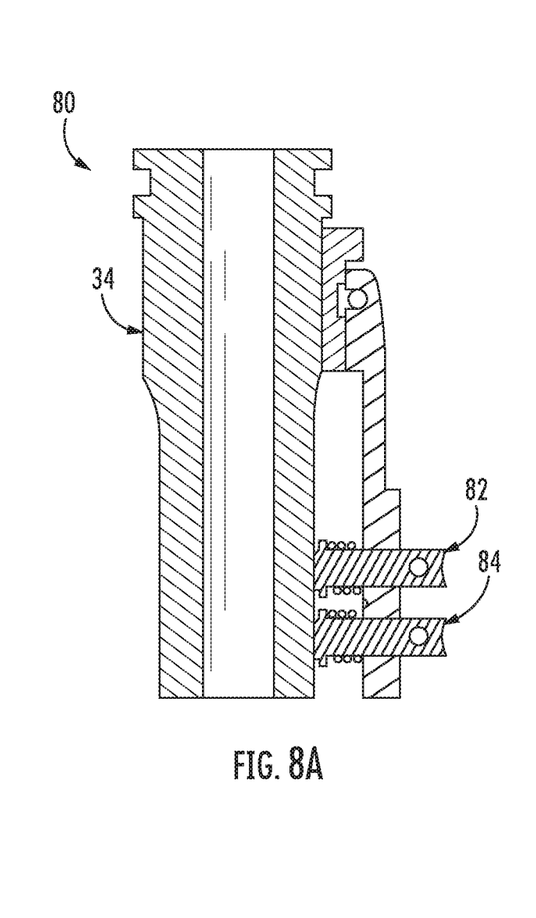
FIGS. 8A-8C illustrate a ratchet locking module locked in both directions according to an example embodiment.

With reference to FIGS. 8A-11C, the shotgun stick 10 may include a ratchet locking module 80 that may be configured to selectively limit rotation of the drive shaft 40 via engagement between a side pin and a ratchet gear of the ratchet locking module 80. In one embodiment, the ratchet locking module 80 may include a first ratchet gear 83, a first side pin 82, a second ratchet gear 85, and a second side pin 84. As shown, the first ratchet gear 83 and the second ratchet gear 84 may be affixed to the drive shaft 40 and configured to rotate therewith. The first side pin 82 may be configured to move between a first position (e.g., FIGS. 9A-9B) in which the first side pin 82 mates with the first ratchet gear 83 and a second position (e.g., FIGS. 10A-10B) in which the first side pin 82 disengages the first ratchet gear 83. Similarly, the second side pin 84 may be configured to move between a first position (e.g., FIGS. 10A-10B) in which the second side pin 84 mates with the second ratchet gear 85 and a second position (e.g., FIGS. 9A-9B) in which the second side pin 84 disengages the second ratchet gear 85. As shown in FIGS. 8A, 9A, and 10A, the first ratchet gear 83 and the second ratchet gear 85 may be located in parallel (e.g. collinear) along the length of the drive shaft 40, and the first side pin 82 and the second pin 84 may also be aligned along the length of the housing 34. While illustrated herein with the first ratchet gear 83 and a second ratchet gear 85 located proximate to one another, the present disclosure contemplates that the respective ratchet gears may be located at any position along the drive shaft 40.

Figure 8B:
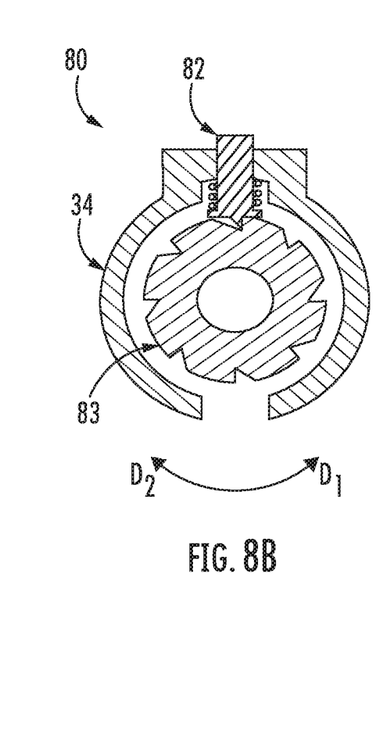
Figure 8C:
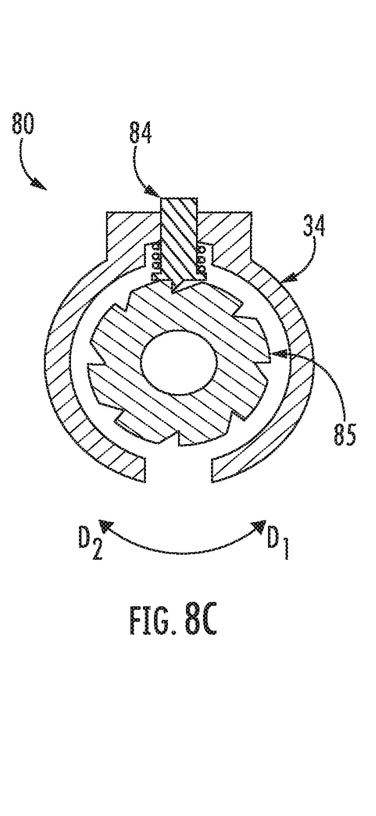

As would be evident to one of ordinary skill in the art in light of the present disclosure, the first ratchet gear 83 and the second ratchet gear 85 may define a plurality of uniform, but asymmetrical teeth. With reference to FIGS. 8A-8C, the ratchet locking module 80 may be configured to prevent rotation of the drive shaft 40 in either direction (e.g., clockwise or counterclockwise directions) based upon engagement of the first side pin 82 and the second side pin 84 with respective ratchet gears 83, 85. As shown, in an instance in which the first side pin 82 and the second side pin 84 are located in the first position, each side pin 82, 84 may mate with (e.g., contact) a corresponding tooth of the respective ratchet gear 83, 85. In such an instance, rotation of the drive shaft 40 in the first direction $D_1$ (e.g., counterclockwise) and in the second direction $D_2$ (e.g., clockwise) is precluded.

Figure 9A:
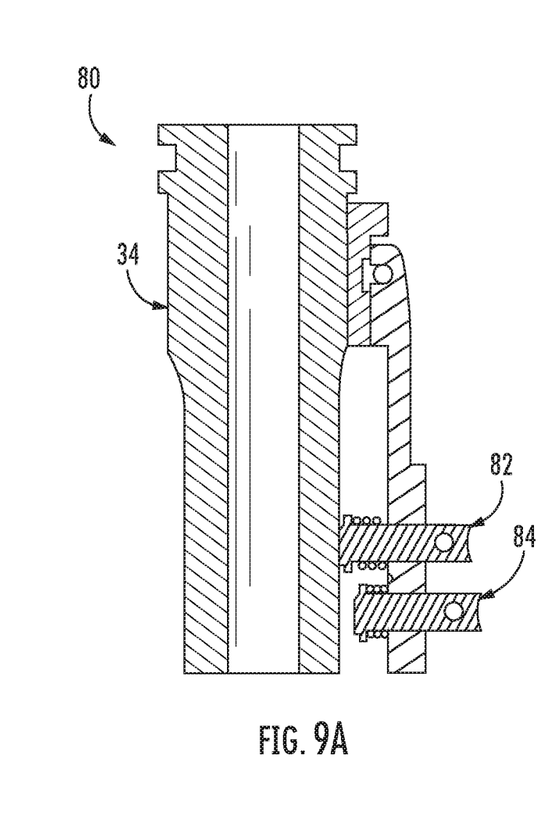
FIGS. 9A-9C illustrate the ratchet locking module of FIGS. 8A-8 locked in a first direction according to an example embodiment.
Figure 9B:
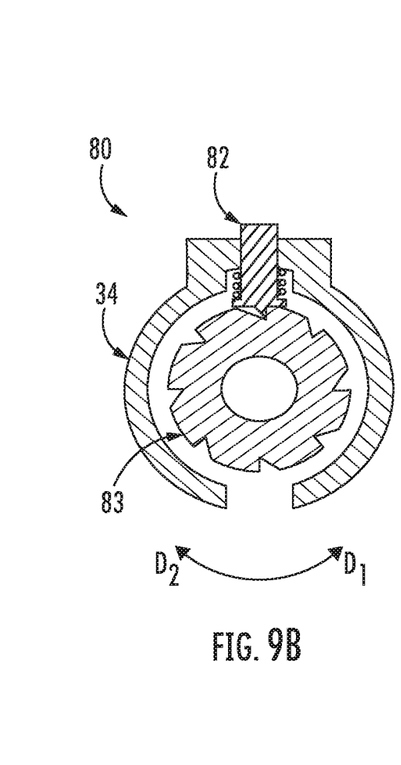
Figure 9C:
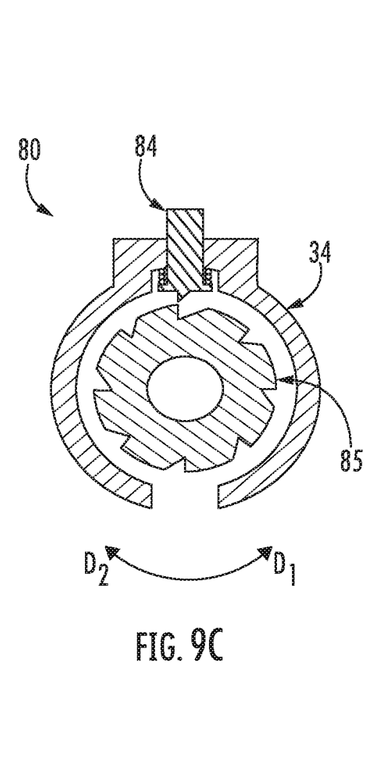

With reference to FIGS. 9A-9C, the ratchet locking module 80 may be configured to prevent rotation of the first ratchet gear 83, and by association the drive shaft 40, in the first direction $D_1$ (e.g., counterclockwise). As shown, the second side pin 84 is located in the second position such that the second side pin 84 is disengaged from the second ratchet gear 85. In this way, the second ratchet gear 85 may rotate freely with the drive shaft 40. The first side pin 82 is located in the first position so as to mate with the first ratchet gear 83. The uniform, asymmetrical shape of the first ratchet gear 83 is such that the first ratchet gear 83 may rotate in the second direction $D_2$, but rotation of the first ratchet gear 83 in the first direction $D_1$ is prevented.

Figures 10A, 10B:
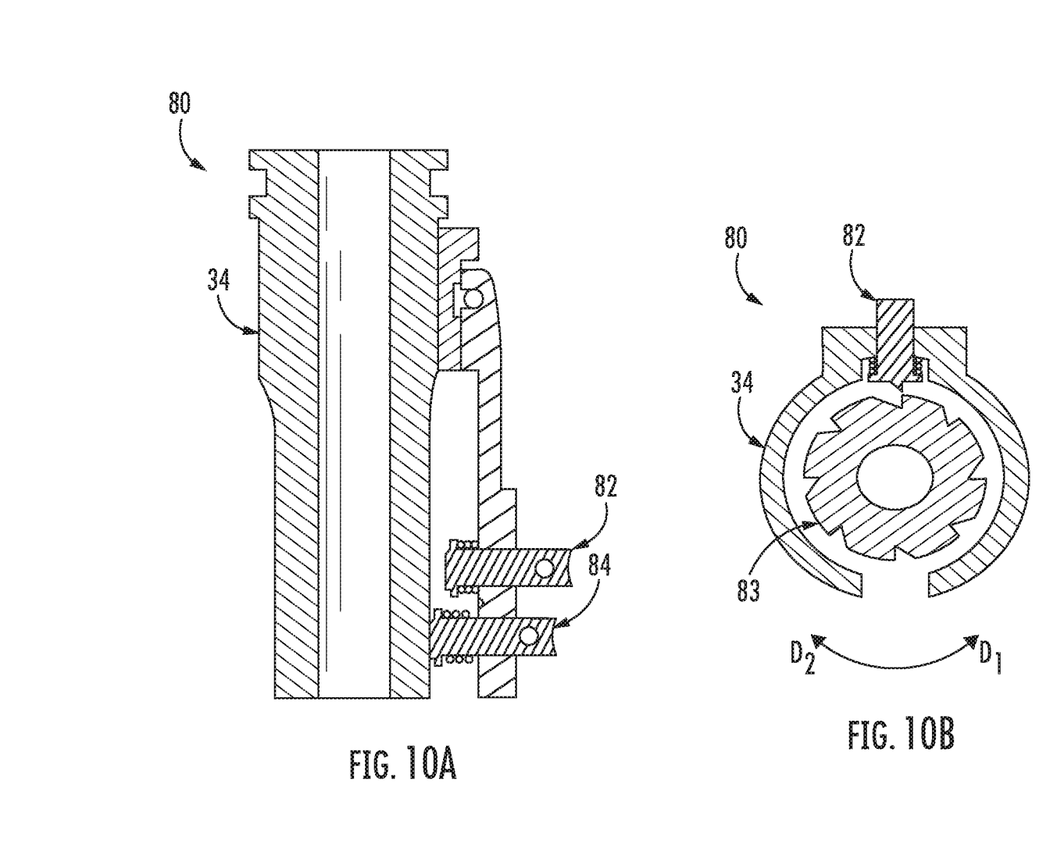
FIGS. 10A-10C illustrate the ratchet locking module of FIGS. 8A-8 locked in a second direction according to an example embodiment.
Figure 10C:
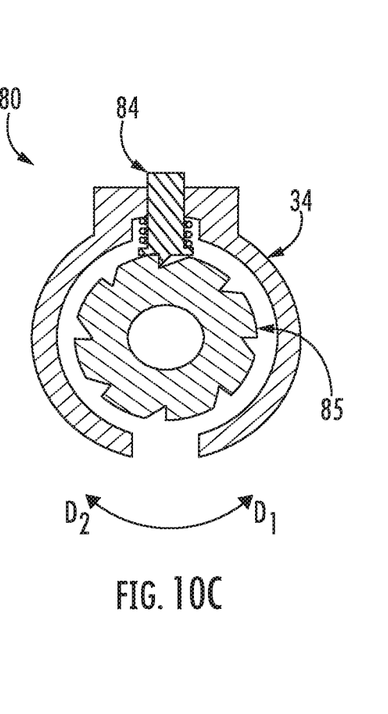

With reference to FIGS. 10A-10C, the ratchet locking module 80 may be configured so as to prevent rotation of the second ratchet gear 85, and by association the drive shaft 40, in the second direction $D_2$ (e.g., clockwise). As shown, the first side pin 82 is located in the second position such that the first side pin 82 is disengaged from the first ratchet gear 83. In this way, the first ratchet gear 83 may rotate freely with the drive shaft 40. The second side pin 84 is located in the first position so as to mate with the second ratchet gear 85. The uniform, asymmetrical shape of the second ratchet gear 85 is such that the second ratchet gear 85 may rotate in the first direction $D_1$, but rotation of the second ratchet gear 85 in the second direction $D_2$ is prevented.

Figure 11A:
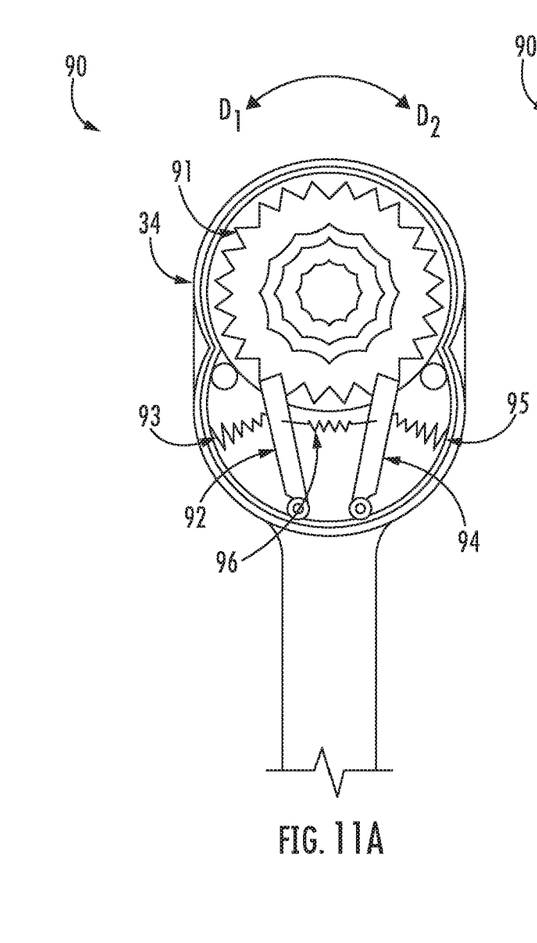
FIGS. 11A-11C illustrate a dual ratchet gear locking module according to an example embodiment.
Figure 11B:
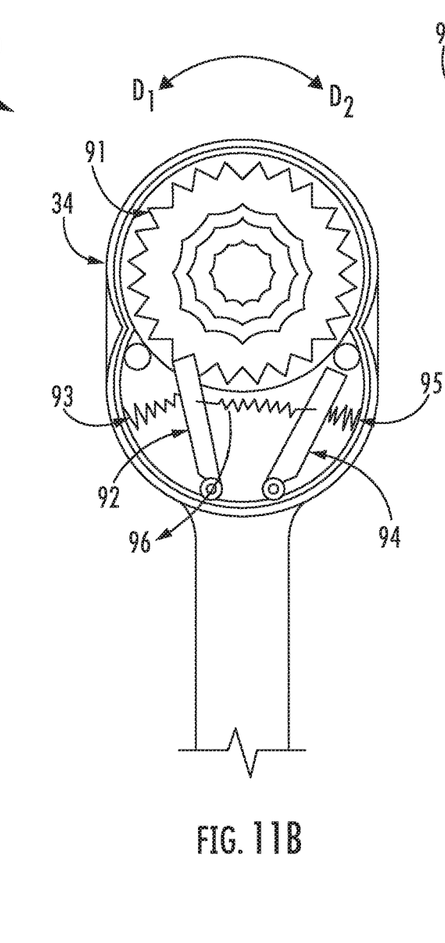
Figure 11C:
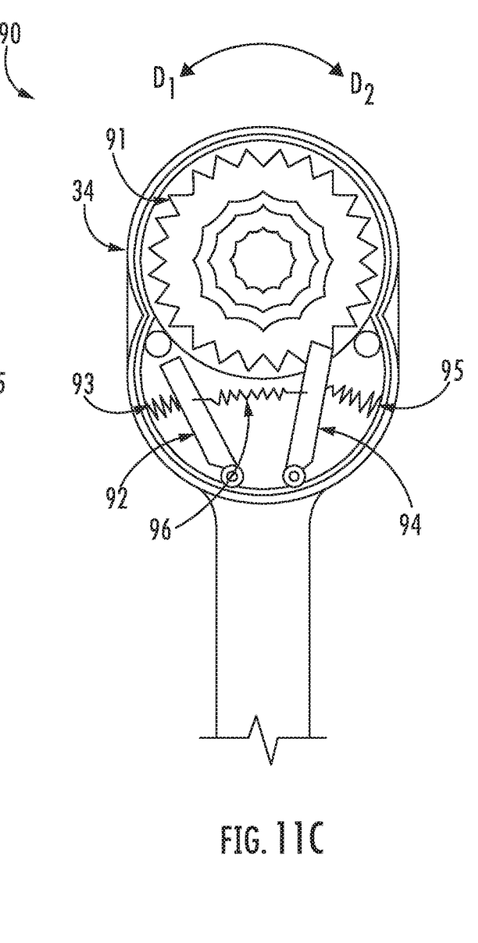

With reference to FIGS. 11A-11C, an alternative ratchet locking module 90 is illustrated. In some embodiments, the alternative ratchet locking module 90 includes a dual ratchet gear 91, a first side pin 92, and a second side pin 94. As shown, the first side pin 92 and the second side pin 94 may be pivotally attached to the housing 34. The first side pin 92 may be configured to move between a first position in which the first side pin 92 mates with the dual ratchet gear 91 (e.g., FIGS. 11A-11B) and a second position in which the first side pin 92 disengages the dual ratchet gear 91 (e.g., FIG. 11C). Similarity, the second side pin 94 may be configured to move between a first position in which the second side pin 94 mates with the dual ratchet gear 91 (e.g., FIGS. 11B-11C) and a second position in which the second side pin 94 disengages the dual ratchet gear 91 (FIG. 11B). As would be evident to one of ordinary skill in the art in light of the present disclosure, the dual ratchet gear 91 may define a plurality of teeth configured to mate with the first side pin 92 and/or the second side pin 94.

With reference to FIG. 11A, the ratchet locking module 90 may be configured to prevent rotation of the drive shaft 40 in either direction (e.g., clockwise or counterclockwise directions) based upon engagement of the first side pin 92 and the second side pin 94 with the dual ratchet gear 91. As shown, in an instance in which the first side pin 92 and the second side pin 94 are located in the first position, each side pin 92, 94 may mate with (e.g., contact) a corresponding tooth of the dual ratchet gear 91. In such an instance, rotation of the drive shaft 40 in the first direction $D_1$ (e.g., counterclockwise) and in the second direction $D_2$ (e.g., clockwise) is precluded.

With reference to FIG. 11B, the ratchet locking module 90 may be configured so as to prevent rotation of the dual ratchet gear 91, and by association the drive shaft 40, in the first direction $D_1$ (e.g., counterclockwise). As shown, the second side pin 94 is located in the second position such that the second side pin 94 is disengaged from the dual ratchet gear 91. The first side pin 92 is located in the first position so as to mate with the dual ratchet gear 91. In such an embodiment, the shape of the dual ratchet gear 91 may be such that the dual ratchet gear 91 may rotate in the second direction $D_2$, but rotation of the dual ratchet gear 91 in the first direction $D_1$ is prevented.

With reference to FIG. 11C, the ratchet locking module 90 may be configured so as to prevent rotation of the dual ratchet gear 91, and by association the drive shaft 40, in the second direction $D_2$ (e.g., clockwise). As shown, the first side pin 92 is located in the second position such that the first side pin 92 is disengaged from the dual ratchet gear 91. The second side pin 94 is located in the first position so as to mate with the dual ratchet gear 91. In such an embodiment, the shape of the dual ratchet gear 91 may be such that the dual ratchet gear 91 may rotate in the first direction $D_1$, but rotation of the dual ratchet gear 91 in the second direction $D_2$ is prevented. As described above, the ratchet locking module 90 may be located at any position along the drive shaft 40 based upon the intended application or dimensions (e.g., size and shape) of the shotgun stick 10.

With continued reference to FIGS. 11A-11C, in some embodiments, the ratchet locking module 90 may include a plurality of springs configured to facilitate movement of the first side pin 92 and the second side pin 94 between the first position and the second position. As shown, the ratchet locking module 90 may include a first spring 93 connected between the housing 34 and the first side pin 92. The first spring 92 may be configured to urge the first side pin 92 to the first position. By way of example, the first spring 92 may be configured as a compression spring such that the resting (e.g., neutral position) of the first side pin 92 is the first position. In this way, the first spring 93 may be configured to prevent accidental rotation of the drive shaft 40 in the first direction $D_1$ (e.g., counterclockwise) by forcing the first side pin 92 into engagement with the dual ratchet gear 91.

Similarly, the ratchet locking module 90 may include a second spring 95 connected between the housing 34 and the second side pin 94. The second spring 95 may be configured to urge the second side pin 94 to the first position. By way of example, the second spring 95 may be configured as a compression spring such that the resting (e.g., neutral position) of the second side pin 94 is the first position. In this way, the second spring 95 may be configured to prevent accidental rotation of the drive shaft 40 in the second direction $D_2$ (e.g., clockwise) by forcing the second side pin 94 into engagement with the dual ratchet gear 91.

With continued reference to FIGS. 11A-11C, in some embodiments, the ratchet locking module 90 may include a third spring 96 connected between the first side pin 92 and the second side pin 94. The third spring 96 may be configured such that, in an instance in which the first side pin 92 is in the second position, the third spring 96 may be configured to urge the second side pin 94 to the first position (e.g., FIG. 11C). Similarly, in an instance in which the second side pin 94 is in the second position, the third spring 96 may be configured to urge the first side pin 92 to the first position (e.g., FIG. 11B). In this way, the third spring 96 may prevent an instance in which the dual ratchet gear 91 is not engaged with either the first side pin 92 or the second side pin 94 (e.g., free to rotate in either direction).

Figure 12:
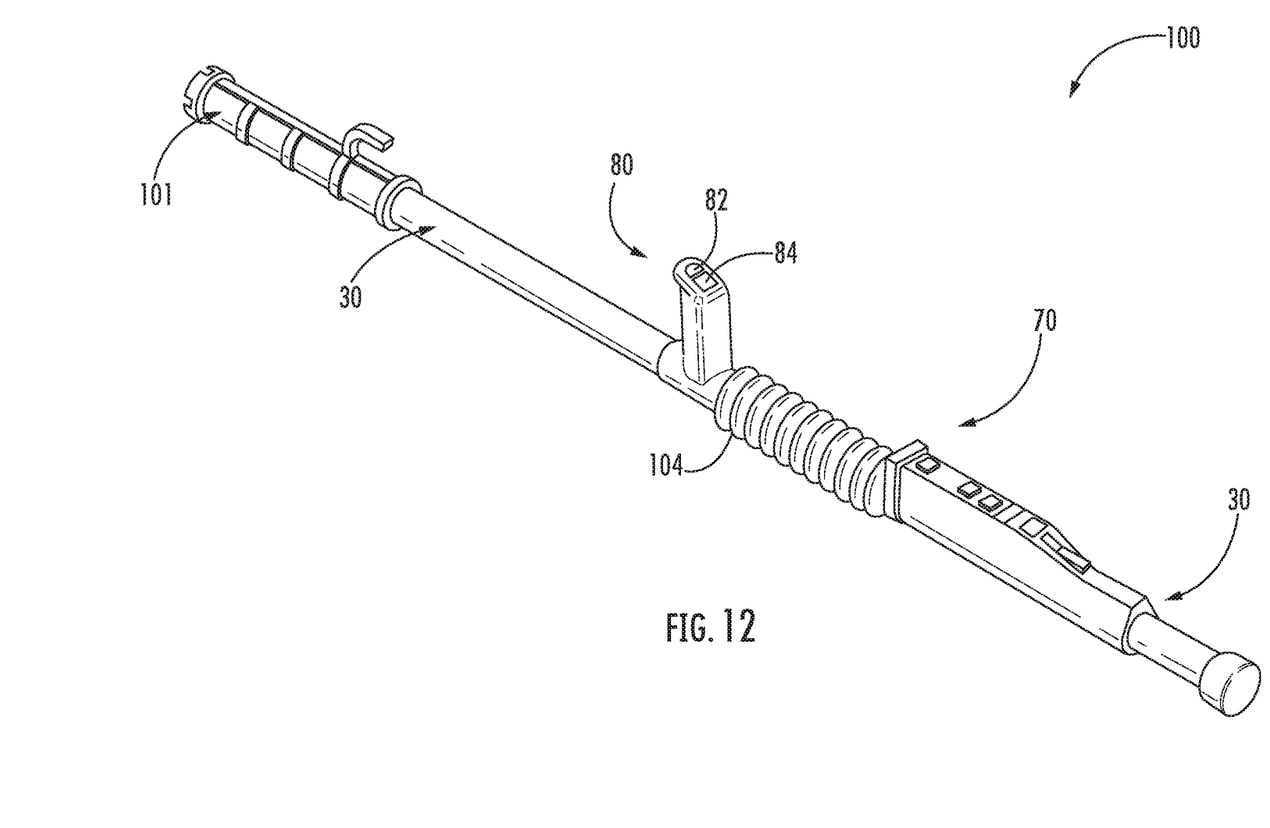
FIG. 12 shows an alternative shotgun stick device according to an example embodiment.

With reference to FIGS. 12-18 an alternative shotgun stick embodiment 100 is illustrated. As shown in FIG. 12, the shotgun stick 100 may include similar elements to the shotgun stick 10 as illustrated and described with reference to FIGS. 1-11 above. In particular, the shotgun stick 100 is shown with an elongate electrically insulating tube 30 (e.g., a housing), an upper housing 52, a flexible bellows 104, and a user interface 70. Shotgun Stick 100, however, includes a clamp stick head 101 that is attached to an end of the housing (e.g. tube 30). As described above, in some embodiments, the shotgun stick 100 may be configured to receive a detachable clamp stick head 101 attached thereto. As would be evident to one of ordinary skill in the art in light of the present disclosure, in some instances, the shotgun stick 100 may be comprised of modular components such that various elements are detachable from the housing or body of the shotgun stick 100. Said differently, the clamp stick head 101 may be attached to a universal hot stick, insulated tube, or the like such that the combined clamp stick head 101 and the universal hot stick operate as a shotgun stick. For example, the shotgun stick 100 may also be configured to receive tools, adapters, modules, grounding devices, and the like attached at a corresponding end of the shotgun stick 100. In this way, the shotgun stick may be configured to drive operation of the tools, adapters, modules, grounding devices, etc. and/or extend the reach of these devices.

Figure 13:
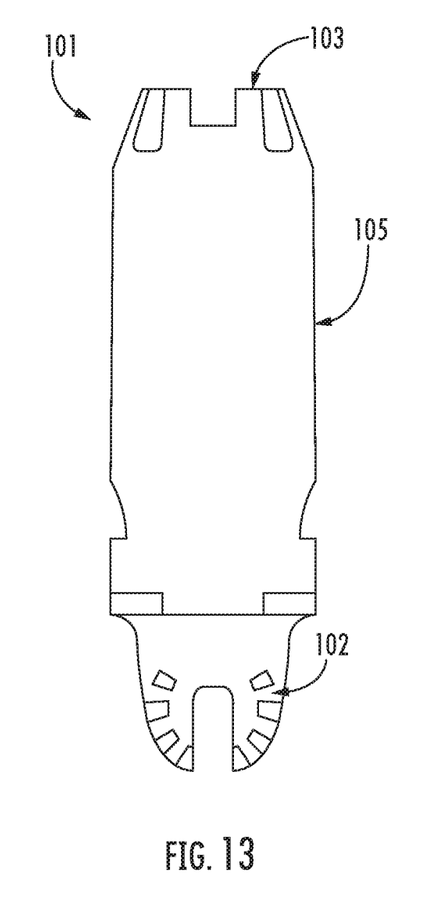
FIGS. 13-18 illustrate various views of an example clamp stick head for use with various embodiments of the present discourse.
Figure 14:
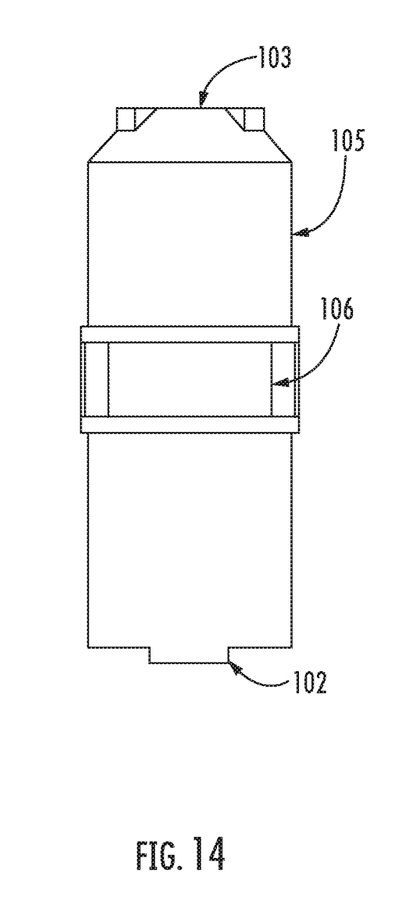
Figure 15:
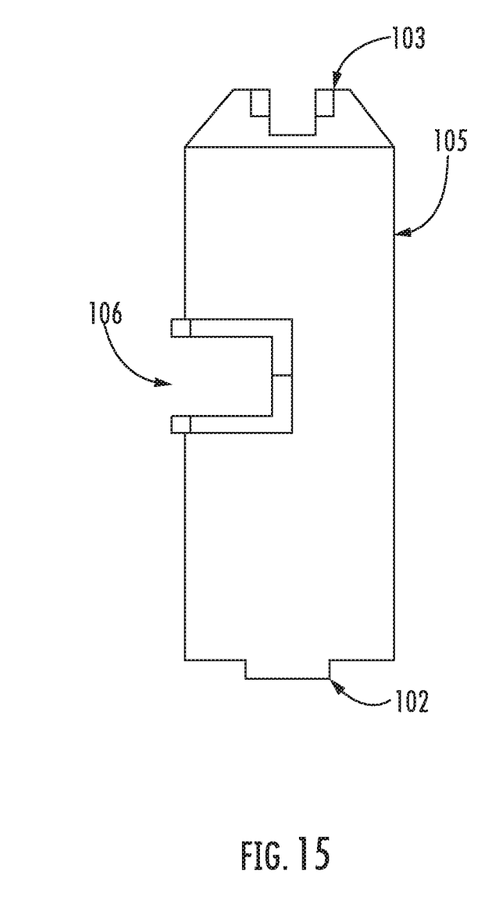
Figure 17:
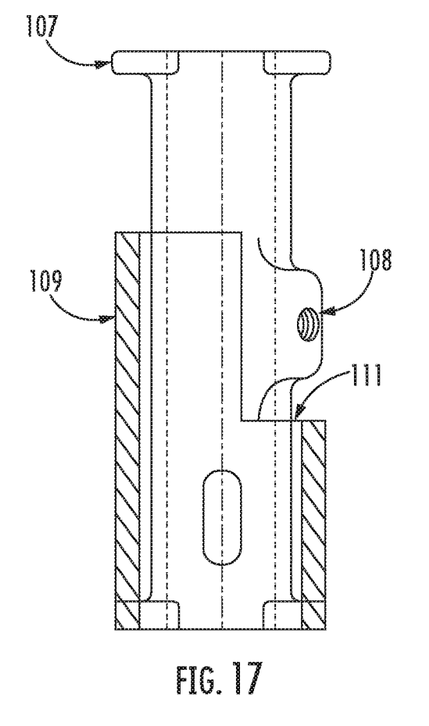
Figure 18:
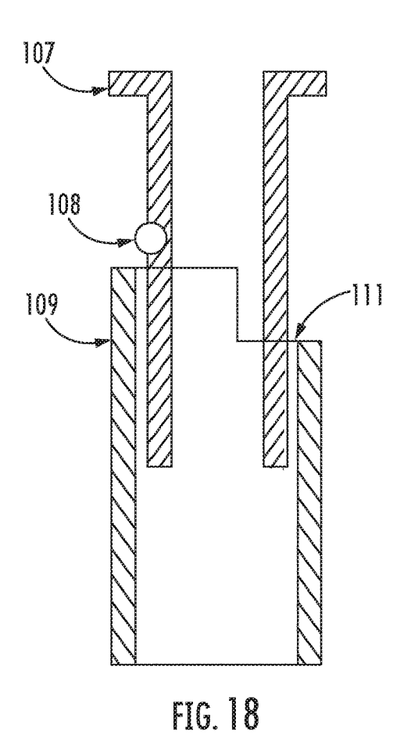

With reference to FIG. 13, a clamp stick head 101 of the present disclosure is illustrated. As shown, the clamp stick head may define an attachment end 102 and a grounding end 103. The attachment end 102 may be configured to mate with a corresponding element of the shotgun stick 100 so as to secure the clamp stick head 101 to the shotgun stick 100. Similar to the grounding clamp 11 described above, the grounding end 103 may operate to provide an electrically conductive connection between the grounding end 103 and an overhead electrical conductor (e.g. conductor 12) received therein. With reference to FIGS. 14-15, the clamp stick head 101 may define an exterior housing 105 configured to support or otherwise enclose one or more elements described hereafter. The exterior housing 105 may further define an access opening 106. As illustrated in FIGS. 17-18, this access opening 106 may allow a user to rotate a tool attachment secured to the head sleeve (e.g., head sleeve 107) between an open and closed position.

Figure 16:
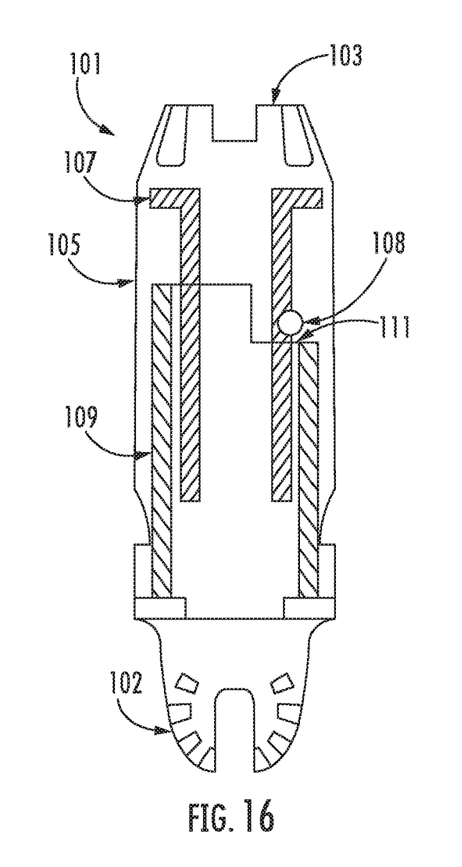

With reference to FIG. 16, a cross-sectional view of the clamp stick head 101 is illustrated in a locked position. As shown, the clamp stick head 101 may include a head sleeve 107 located within the exterior housing 105 that defines an opening 108 configured to receive a tool attachment (not shown) secured thereto. As shown in the front view of FIG. 17, the clamp stick head 101 may further include an inner sleeve 109 that is positioned between the exterior housing 105 and the head sleeve 107. The inner sleeve 109 may define a slotted portion 111 that is configured to prevent rotation of the tool attachment (not shown) in an instance in which the tool attachment (not shown) is secured to the opening 108 in the head sleeve 107. As would be evident to one of ordinary skill in the art in light of the present disclosure, the opening 108 of the head sleeve 107 may receive a tool attachment (e.g., screw or equivalent attachment element) configured to secure the exterior housing 105 to the shotgun stick 100 (e.g., via the attachment end 102).

In the locked position shown in FIGS. 16-17, the opening 108 is located within the slotted portion 111 of the inner sleeve 109 such that the slotted portion 111 is configured to prevent rotation of the tool attachment (not shown) in an instance in which the tool attachment (not shown) is secured to the opening 108 in the head sleeve 107. As shown, in an instance in which the opening receives the tool attachment, the slotted portion 111 may be configured to prevent any rotation of the head sleeve relative to the inner sleeve 109. In this way, the slotted portion may be configured to prevent accidental disengagement of the clamp stick head 101 from the shotgun stick 100. With reference to FIG. 18, the head sleeve 107 is illustrated in an unlocked position in which the opening 108 is located adjacent the slotted portion 111 such that a tool attachment attached to the opening 108 may rotate unimpeded. The head sleeve 107 may move from the locked position to the unlocked position by translating (as opposed to rotating) relative to the inner sleeve 109. As described with reference to FIGS. 14-15, the exterior housing 105 may include an access opening 106. In the unlocked position of FIG. 18 in which the opening 108 is not located within the slotted portion 111, the opening 108 (and tool attachment secured thereto) may rotate within the access slot 106 of the exterior housing 105.

Returning to FIG. 12, the shotgun stick 100 may also include a user interface 70 that may be formed with a portion of the housing (e.g., the bottom housing 34 described above), and may include a power switch (not shown) and/or a pair of motor control switches (not shown). In such an embodiment, the clamp stick head 101 may be configured to attach to a shotgun stick 100 comprising a motor (e.g. motor 36) such that the motor of the shotgun stick 100 drives operation of the clamp stick head 101. As described above, the clamp stick head 101 may operate as a modular component such that the shotgun stick 100 may house any circuitry or related electrical elements for driving the clamp stick head 101 when attached thereto.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A shotgun stick for use with grounding devices, the shotgun stick comprising:
   a housing, wherein the housing defines a first end and a second end opposite the first end;
   a drive shaft supported within the housing;
   a clamp stick head attached to the housing at the first end and operably connected to a first end of the drive shaft, wherein rotation of the drive shaft is configured to actuate the clamp stick head; and
   a ratchet locking module configured to selectively limit rotation of the drive shaft via engagement between a side pin and a ratchet gear of the ratchet locking module.

2. The shotgun stick according to claim 1, further comprising a motor assembly operably connected to a second end of the drive shaft, wherein the motor assembly is configured to drive the drive shaft so as to actuate the clamp stick head.

3. The shotgun stick according to claim 1, wherein the clamp stick head further comprises a grounding clamp assembly, wherein the grounding clamp assembly is configured to receive an electrical conductor therein.

4. The shotgun stick according to claim 3, further comprising a torque connector coupled with a first end of the drive shaft, wherein the torque connector is configured to operably connect the first end of the drive shaft to the clamp stick head.

5. The shotgun stick according to claim 1, wherein the ratchet locking module further comprises:
   a first ratchet gear affixed to the drive shaft; and
   a first side pin, wherein the first side pin is configured to move between a first position in which the first side pin mates with the first ratchet gear and a second position in which the first side pin disengages the first ratchet gear.

6. The shotgun stick according to claim 5, wherein, in an instance in which the first side pin is in the first position, the first side pin is configured to prevent rotation of the first ratchet gear in a first direction.

7. The shotgun stick according to claim 6, wherein the ratchet locking module further comprises:
a second ratchet gear affixed to the drive shaft; and
a second side pin, wherein the second side pin is configured to move between a first position in which the second side pin mates with the second ratchet gear and a second position in which the second side pin disengages the second ratchet gear.

8. The shotgun stick according to claim 7, wherein, in an instance in which the second side pin is in the first position, the second side pin is configured to prevent rotation of the second ratchet gear in a second direction.

9. The shotgun stick according to claim 1, wherein the ratchet locking module further comprises:
a dual ratchet gear;
a first side pin, wherein the first side pin is configured to move between a first position in which the first side pin mates with the dual ratchet gear and a second position in which the first side pin disengages the dual ratchet gear; and
a second side pin, wherein the second side pin is configured to move between a first position in which the second side pin mates with the dual ratchet gear and a second position in which the second side pin disengages the dual ratchet gear.

10. The shotgun stick according to claim 9, wherein the first side pin and the second side pin are each pivotally attached to the housing.

11. The shotgun stick according to claim 9, further comprising a first spring connected between the housing and the first side pin configured to urge the first side pin to the first position.

12. The shotgun stick according to claim 9, further comprising a second spring connected between the housing and the second side pin configured to urge the second side pin to the first position.

13. The shotgun stick according to claim 9, further comprising a third spring connected between the first side pin and the second side pin, wherein, in an instance in which the first side pin is in the second position, the third spring is configured to urge the second side pin to the first position, and wherein, in an instance in which the second side pin is in the second position, the third spring is configured to urge the first side pin to the first position.

14. The shotgun stick according to claim 9, wherein, in an instance in which the first side pin and the second side pin are each in the first position, the first and the second side pins are configured to prevent rotation of the dual ratchet gear.

15. The shotgun stick according to claim 9, wherein, in an instance in which the first side pin is in the first position and the second side pin is in the second position, the first side pin is configured to prevent rotation of the dual ratchet gear in a first direction.

16. The shotgun stick according to claim 9, in an instance in which the second side pin is in the first position and the first side pin is in the second position, the second side pin is configured to prevent rotation of the dual ratchet gear in a second direction.

17. The shotgun stick according to claim 1, wherein the clamp stick head is detachable from the first end of the housing.

18. The shotgun stick according to claim 1, wherein clamp stick head further comprises:
an exterior housing;
a head sleeve within the exterior housing, wherein the head sleeve defines an opening configured to receive a tool attachment secured thereto; and
an inner sleeve positioned between the exterior housing and the head sleeve, wherein the inner sleeve defines a slotted portion configured to prevent rotation of the tool attachment in an instance in which the tool attachment is secured to the opening in the head sleeve.

19. A clamp stick head comprising:
an exterior housing;
a head sleeve within the exterior housing, wherein the head sleeve defines an opening configured to receive a tool attachment secured thereto; and
an inner sleeve positioned between the exterior housing and the head sleeve, wherein the inner sleeve defines a slotted portion,
wherein the head sleeve is configured to be translated relative the inner sleeve between:
a locked position in which the opening is located within the slotted portion of the inner sleeve such that the slotted portion is configured to prevent rotation of the tool attachment in an instance in which the tool attachment is secured to the opening in the head sleeve, and
an unlocked position in which the opening is located adjacent the slotted portion such that the tool attachment rotates unimpeded in an instance in which the tool attachment is secured to the opening in the head sleeve.

20. The clamp stick head according to claim 19, wherein the clamp stick head is configured to attach to a shotgun stick comprising a motor such that the motor of the shotgun stick drives operation of the clamp stick head.

* * * * *